United States Patent [19]

Keegan

[11] 4,109,639
[45] Aug. 29, 1978

[54] SOLAR HEATING SYSTEM
[75] Inventor: Partick J. Keegan, Van Nuys, Calif.
[73] Assignee: Rho Sigma, North Hollywood, Calif.
[21] Appl. No.: 805,695
[22] Filed: Jun. 13, 1977
[51] Int. Cl.² .................................. F24J 3/02
[52] U.S. Cl. ................................. 126/271
[58] Field of Search ............ 126/271; 237/1 A
[56] References Cited
U.S. PATENT DOCUMENTS
3,986,489 10/1976 Schlesinger ............... 126/271
3,998,207 12/1976 Watt ........................ 126/271

Primary Examiner—Carroll B. Dority, Jr.
Attorney, Agent, or Firm—Ralf H. Siegemund

[57] ABSTRACT

The heating system includes a solar energy collector and a tank. Water circulation is controlled normally in a proportional mode using a pump which is turned on intermittently for a duration synchronized with full AC cycles. Impending freezing and boiling in the water system is separately detected controlling a drain valve for the collector while holding the pump in the off state.

23 Claims, 7 Drawing Figures

SOLAR HEATING SYSTEM

BACKGROUND OF THE INVENTION

The present invention refers to a system for making use of solar energy, and more particularly the invention relates to the control for such a system causing it to operate at a high efficiency with regard to the energy collected by that system as well as with regard to the operation of the system itself.

It is generally known to use collectors with large surfaces for absorbing solar energy or for dissipating thermal energy at night time over a large area. It is also known to employ, for example, water as a storage medium for solar energy and to provide for circulation between water in a tank for storing solar energy and a collector serving as a heat exchanger between the circulating water and the environmental condition presented, for example, as influx of solar energy.

U.S. Letters Patent 3,986,489 discloses such a device and it discloses in particular an improvement with regard to preventing such a collector from freezing if for any reason the environment temperature drops below the freezing point. In addition this patent discloses a further improvement of the system to prevent boiling of the water in the tank. The present invention relates in particular to improvements in the control of such a system.

DESCRIPTION OF THE INVENTION

It is an object of the present invention to provide for a new and improved system for the control of a solar heat accumulation system which is efficient and adaptive to environmental conditions under which it operates.

It is a specific object of the present invention to improve a system which includes a collector exposed to solar radiation, a water tank for storing thermal energy in the form of heated water and a pump for sustaining the flow of water from the tank through the collector for being heated in the collector and back into the tank. Moreover, the system to be improved has a control circuit particularly for the pump which circuit includes two temperature sensitive elements or detectors respectively sensing the temperature of the water in the collector or as it leaves the collector, and the temperature of the water in the tank or as it leaves the tank.

In accordance with the preferred embodiment of the present invention, it is suggested to provide a first control circuit connected to the elements to establish a signal that represents the temperature differential, and a second control circuit is connected to sense limit conditions such as extreme cold temperature conditions in the collector and/or extreme hot temperature conditions in the tank. A reference signal is separately generated in the form of a cyclically repeated staircase signal whereby the steps concur with AC supply voltage zero crossings; the reference signals vary in such steps from a first value to a second value from which the reference signal drops back to the first value. A pulse train generator is connected to the staircase signal and the pulse width is determined by the periods of time the staircase signal remains above or below the temperature differential signal, whereby any leading and any trailing pulse edge always concurs with an AC zero crossing. These pulses are fed to a pump control circuit which turns the pump on for the duration of a pulse, that is to say, for a particular number of AC cycles, while the pump is off for the remainder of the pulse rate repetition (being equal to the reference repetition cycle).

The second control circuit is used as a valve control circuit, for example, to cause or to permit draining of the collector in the case of impending freezing and/or of boiling. Moreover, the second control circuit may provide a clamp and/or override, generally, to establish steady operation of the pump; that is to say for excessive hot thermal condition in the tank, or cold conditions in the collector, the pump is just turned off regardless of the temperature differential signal. Alternateively, freezing of the collector can be prevented by circulating briefly warm water through the collector.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawing, FIG. 1 shows a relatively large, flat plate collector 10, having a large "black" surface exposed to the radiation of the sun and mounted, for example, to the southside roof of a dwelling. A meandering duct 11 is provided directly underneath the black surface in good thermal conductive relation therewith or even constituting a part thereof. Water flows through the collector duct 11 which is fed thereto by a pipe 12 and discharged therefrom via a pipe 13.

Figure 1:
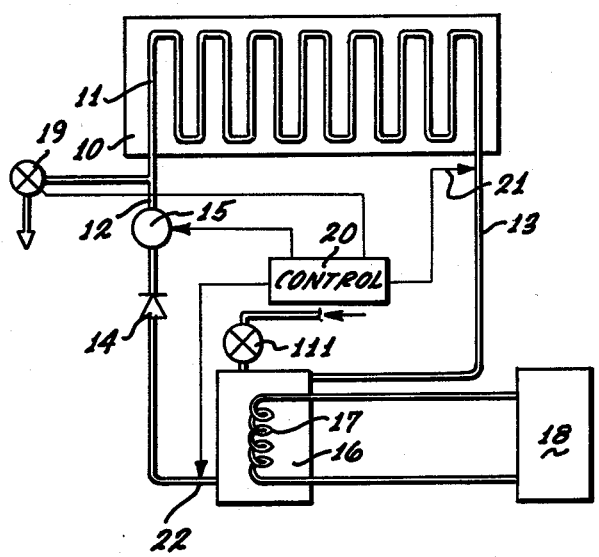
FIG. 1 is a schematic illustration of a system incorporating the features of the preferred embodiment of the present invention.

Water is pumped up in a pipe 12 by an electrically controlled pump 15, drawing water from a storage tank 16, particularly from the bottom thereof. Water flows into the tank through pipe 13 simply by force of gravity as the tank is presumed to be in a lower portion of the building. There is no inherent necessity for this spatial relation, but that will simply be the result of considerations of practicality.

A check valve 14 prevents backflow of water in the ascending path, when pumped. A normally closed valve 19 permits draining of the collector. Please note that descending pipe 13 will not drain the collector; even when the pump is off; because the system should be filled with water. The filling state will be actively maintained if the water system is connected to the city mains, e.g. with a controlled valve 11.

A heat exchanger 17 may be included in tank 16 for feeding the heating system 18 of the building. However, the water of tank 16 itself could be circulated through the heating system; on the other hand temperature control and constant water temperature in the user circuit is more readily obtained when the circulations are kept separately. This way, the collector-tank circulation can accumulate as much thermal solar energy as the collector can gather on a day-by-day basis and as weather conditions permit. That amount of energy may differ from day to day.

The pump 15 is controlled by the circuit 20 operating in such a manner that water is permitted to descend through pipe 13 only when the collector water is hotter than the water in the bottom portion of the tank 16. Then and only then will cooler water be pumped from tank 16 up to the collector 10 for being heated before return to the tank.

For normal operation, control circuit 20 operates the pump 15 on the basis of the temperature differential between collector temperature and tank temperature. The temperature differential is detected by measuring the temperature of the water in the collector (transducer 21) or near the outlet thereof and by measuring the temperature e.g. at the outlet of or otherwise near the bottom of tank 16 (transducer 22). The control circuit 20 processes the signals provided by transducers 21, 22 for controlling pump 15 proportionate with the temperature differential. One will preferably use thermistors as temperature sensing transducers.

By way of example, during the day water is heated in the collector up to 130° F or higher, such as 160° F or even more. The tank temperature may rise to 115° F or higher, but during solar heating the temperature difference will become and, usually, remain significant. If the tank temperature approaches boiling, circulation will be stopped entirely by turning the pump 15 off. Additionally, the collector may be drained to avoid boiling the sediment depositing under such excessive heat conditions. If the tank—collector circuit is under pressure control from the maines, valve 111 has to be closed.

As evening approaches, the temperature differential between tank and collector will be reduced, i.e., the collector temperature will approach the tank temperature. The development of the tank temperature will depend to a considerable extent on the amount of energy that is being withdrawn from the tank, but the capacity of the tank should be sufficient, so that the temperature drop in the tank will be a gradual one and that drop can be expected to occur much slower than the drop in collector temperature around sundown and later.

As the temperature differential approaches a turn-off point, circuit 20 stops the pump 15. During the night the collector temperature may drop drastically, even below the tank temperature, though the tank temperature will drop also, particularly if the system runs as central heating system. In the morning the collector temperature will begin to rise again. Since thermal energy has been taken from the tank during the night the tank temperature did drop further, so that the pump will be turned on shortly after the collector temperature begins to rise following sunrise.

Should the temperature in the collector as monitored at 21 drop dangerously close to freezing during the night, circuit 20 will hold the pump 15 off, but will open valve 19 thereby draining the collector. If the water system is under city water pressure, normally open valve 111 must be closed whenever drain valve 19 opens. An alternative freeze protection does not use drain valve 19; instead water is permitted to circulate through the collector, just sufficient to prevent the water in the collector from freezing.

Figure 2:
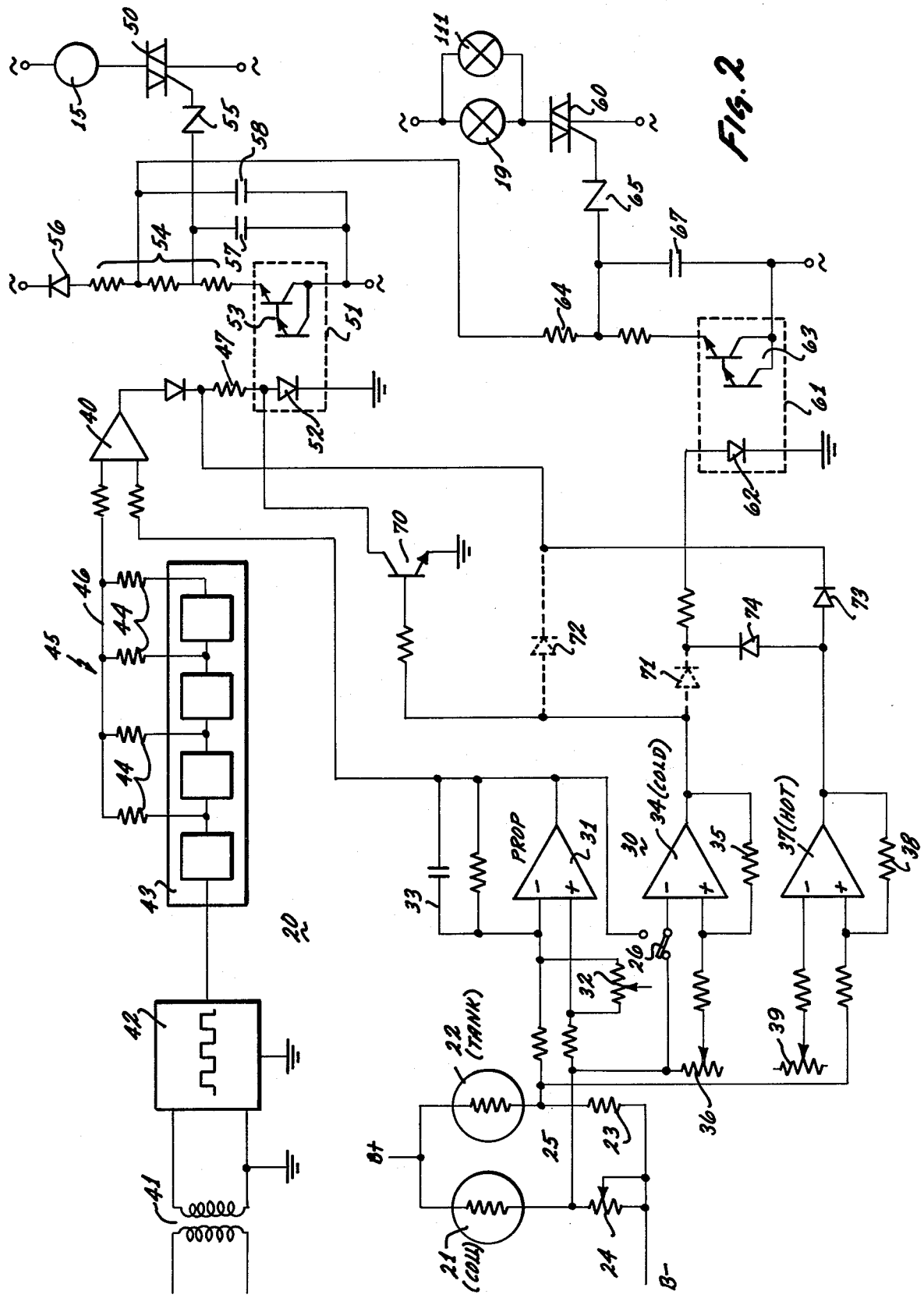
FIG. 2 is a circuit diagram of a control circuit to be used in the system shown in FIG. 1 and including the preferred embodiment of the present invention.

The control circuit 20 shown in FIG. 2 includes a sensing bridge 25, which is DC biased through appropriate sources of potential B+ and B−. The bridge 25 is comprised of the two thermistors 21 and 22 establishing two of the four bridge branches. The bridge is completed by the two biasing resistors 23 and 24. Resistor 24 is adjustable for balancing the bridge. The bridge voltage is taken from between the junction of elements 21 and 24 on one hand and elements 22 and 23 on the other hand. That bridge voltage is applied through suitable input resistances to a first differential amplifier 31, being one of a set 30 of altogether three differential amplifiers or comparators. The amplifier 31 includes a feedback resistor 33 for establishing the gain. A potentiometer 32 is connected across the inverting and noninverting inputs of amplifier 31. The tap of the potentiometer 32 is connected to a particular source of voltage potential, and the adjustment establishes a particular operational range for the differential amplifier 31 in relation to the bridge voltage.

In essence, the amplifier 31 compares the bridge diagonal voltage with an offset voltage introduced by the potentiometer 32. A particular low differential of a few degrees (collector temperature being higher) in conjunction with the adjustment of potentiometer 32 will establish a particular output level $V_1$ for amplifier 31 of, say 1 volts. The numerical value is not, of course, of any general significance except that this value is to represent the fact that some pump action is desired. The amplifier 31 is further adjusted (by means of gain adjustment) so that for a second, higher temperature differential, a particular voltage $V_h$ is provided by amplifier 31. The significance of this signal level is that for tank-collector temperature differentials, equal to or larger than that second differential continuous pumping operation is desired, i.e., the pump 15 is to operate at maximum capacity when the output of amplifier 31 is $V_h$ or higher. In between the Values $V_1$ and $V_h$ amplifier 31 operates as proportional amplifier as far as the temperature differentials is concerned.

A second differential amplifier 34 has its inverting input connected to the junction between elements 21 and 24 and receives, in the essence, a voltage derived from the collector temperature sensing thermistor 21. The connection could be made via switch 26 or a jumper for purposes to be described later. The noninverting input of amplifier 34 is suitably DC biased (circuit 36), and a feedback resistor 35 establishes the necessary high gain, so that the amplifier 35 functions as a comparator and has either a low output $V_1$ or a high output $V_h$ depending upon the sign or the difference in signals as applied to the inputs. Resistor 35 ensures rapid change from one value to the other when the sign changes; a high gain prevents also any chattering in the output action. As long as the temperature in the collector remains, say, at least several degrees above freezing, amplifier 34 provides the low output $V_1$. As the freezing level approaches, amplifier 34 switches to the high output $V_h$. The DC bias 36 adjusts the switching level, and switching occurs at a rapid rate due to feedback resistor 35.

A third amplifier 37 of the set 30 has its noninverting input resistively connected to the bridge junction to which is connected the tank temperature sensing thermistor 21. The inverting input of amplifier 37 is suitably DC biased (circuit 39). The bias applied to the inverting input of amplifier 37 is selected so that in case the tank temperature approaches the boiling point amplifier 37 changes state and switches, for example, for a low output $V_1$ to the high output voltage $V_h$. Feedback resistor 38 ensures rapid change over.

It can thus be seen, that amplifier 31 is a proportional amplifier, at least for a significant range of temperature differentials, while amplifiers 34 and 37 are limit detectors, switching rapidly from one state to the other one when the respective limit is being reached, whereby the respective limit or alarm condition established has a high output in either case.

After having described the sense circuit and the immediate amplifier set connected to the sense circuit we now turn to details of the proportional control as provided for the pump 15. A transformer 41 is connected to the AC mains and reproduces the AC oscillating output. The secondary winding of the transformer is connected, as an input, to a square wave generator 42 which provides a pulse train in which, for example, the pulses represent positive half waves, and the spaces or pauses represent negative half waves of the AC signal.

It is important that this particular pulse train has a very definite phase relation to the AC voltage as applied in that the pulse edges occur precisely at the zero crossings of the AC voltage particularly as also applied to pump 15. This pulse train is fed to a binary counter 43 having four stages (toggle flip flops) and, therefore counts from zero to 15; recycling occurs upon the next pulse when the counter is in count state 15. Each of the four stages has its output connected, first of all, to the respective next stage in order to obtain binary counter sequencing. In addition, each stage output is connected to a particular resistor of a set 44 of altogether four resistors which are tied together in a common junction 46.

Figure 3:
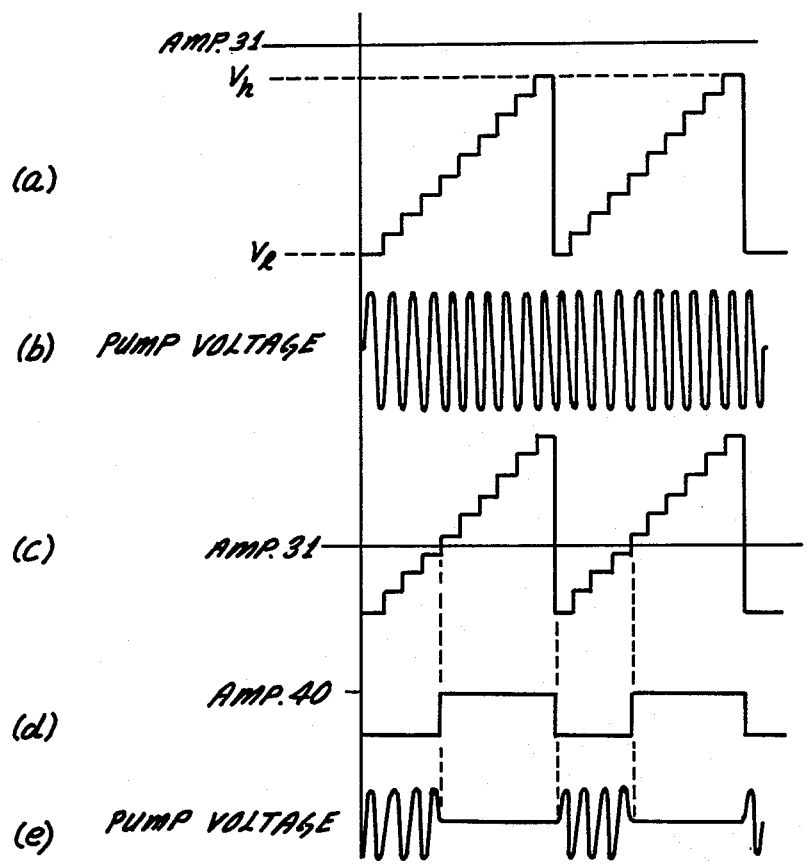
FIGS. 3a and 3e are time diagrams of several signals as they occur in the circuit shown in FIG. 2.

The resistors 44 are binary weighted so that the junction 46 receives a voltage which is proportional to the count state of the counter 43. Therefore, the voltage generated at that junction 46 varies in steps from a relatively low value to the highest value of the system and drops back to the lowest value when the counter recycles. The low voltage may be equal to or slightly below the level $V_L$ introduced above, and the highest voltage (corresponding to count state 15) may be equal to $V_h$. The elements 43, 44 and 46 together (possibly including also 42) can be termed a staircase signal generator 45. FIGS. 3a and 3c illustrate that staircase voltage. It is now quite important that each of the jumps or steps in the staircase voltage occurs at a zero crossing of the AC voltage, for example, at the upswing zero crossings.

The junction 46 is connected to the noninverting input of a differential amplifier 40 functioning as a comparator and having only a high or a low output depending on the sign of the differences in the signals applied as input. The inverting input of amplifier 40 receives the output of amplifier 31. It will be recalled that in the general case, the voltage taken from amplifier 31 has a value which, basically, can fall into one of three ranges. The voltage from amplifier 31 can either be higher than the highest voltage as it may appear in junction 46, i.e., $V_h$; it may be lower than the lowest voltage as it may appear in junction 46, i.e., below $V_L$, or the output of amplifier 31 may provide a voltage which is situated within the range $V_L$-$V_h$ being a value between the highest and the lowest staircase voltage that can be taken from generator 45.

In the first and second case, the amplifier 40 will not change its state, i.e., it will provide one output in the first case, permanently and irrespective of the cyclic counter operation; in the second case, the amplifier 40 will provide the opposite output which also remains stably constant irrespective of the cyclic counter operation. Specifically, the amplifier 40 provides a low output when the signal from amplifier 31 is higher than $V_h$ in representation of a very high temperature differential. FIG. 3a assumes such a case; the staircase voltage never reaches the signal level from 31. Amplifier 40 provides a continuous high output when the signal from amplifier 31 is lower than $V_1$ in representation of a small temperature differential or even a temperature differential in which the collector temperature is below the tank temperature.

The situation is different for a voltage from amplifier 31, i.e., for tank-collector temperature differentials, which in effect are not too large or not too small. Such a voltage has a level in between $V_1$ and $V_h$. FIG. 3c depicts a typical case. In the beginning of each staircase cycle the voltage from 46 drops from $V_h$ to $V_1$. The output of amplifier 40 will, therefore, be switched, for example, from a high level state to a low level state. Thereafter the staircase voltage increases in steps and during a particular jump the staircase voltage as applied to the noninverting input of 40 will exceed the temperature differential voltage from amplifier 31, and the output level of amplifier 40 goes up. This particular change in state will always occur following a change of state of the counter which, in turn, occurs on a zero crossing of the AC voltage. Therefore, any change in output of amplifier 40 is synchronized to a zero crossing of the AC voltage which is important for further aspects of the control to be described shortly.

It can thus be seen that for any of the voltages of amplifier 31 within the proportionate control range, amplifier 40 will have the low output state for one or several AC cycles, and during the remaining of altogether of 16 AC cycles within a staircase cycles, the amplifier 40 will have the opposite, i.e., high state. At the end of a staircase cycle the counter recycles and the amplifier 40 returns to the low output state.

The assembly of elements having amplifier 40 as an output can, therefore, be termed a pulse generator, producing a pulse train at the cycle rate of signal generator 45. The pulses have a width that represents the differential between tank and collector temperatures. It will be appreciated that it is optional which signal level is termed a pulse and which one is a pause, because that depends on the subsequent use. Presently the low state of amplifier 40 constitutes a pulse and it will be appreciated upon comparing FIG. 3c with FIG. 3d, that the widths of the thus defined pulses are proportional to the amplitude of the output of amplifier 31 which means that the pulse width is proportional to the tank-collector temperature differential within the specific range of proportionate control.

The particular output voltage of amplifier 40 is applied via a diode and a resistor 47 to a light emitting diode 52 or LED for short. The light emitting diode 52 pertains to an optical isolator 51 whose optical input element is a Darlington type transistor configuration 53 which is rendered conductive when the diode 52 emits light and nonconductive when the diode 52 does not emit light. The particular transistor circuit 53 is connected by means of several resistors 54 as well as a particular diode 54 between the AC supply voltage. A first resistor tap connects to a diac 55 which in turn connects to the control electrode of a triac 50. The triac 50 is connected in series with the pump 15 and the triac-pump circuit is connected between the AC voltage.

Power is applied to the diac 55 by the half wave rectifier 56 and via a filter which includes a portion of the resistances 54 as well as a filtering capaciter 58. A capaciter 57 together with a diac 55 constitutes a relaxation oscillator which is supplied through this rectifier-plus-filter circuit, provided however, transistor 53 is non-conductive.

Whenever the optical isolator 51 is off, i.e., the LED 52 is off (output of 40 being low) transistor circuit 54 is nonconductive. The resulting voltae across the diac and its associate capaciter 57 causes it to operate as a relaxation oscillator at a rather high frequency as compared with the mains frequency. The oscillator may have a 2 kc frequency. Each time the diac fires pursuant to oscillations, the resulting current flow triggers the triac 50 and supplies power to the pump 15. Whenever the optical isolator 51 is on, that is to say the diode 52 emits light (output of 40 being high) oscillating circuit is shortcircuited, and the triac will not be triggered.

It can thus be seen that the control voltage as applied from transistor 53 via the diac 55 to the triac 50 does or does not permit firing of the triac. Any change in that voltage occurs when the LED 52 lights up or extinguishes, and that action occurs always right at the zero crossing, so that, irrespective of negligibly small electronic delays, the triac 50 is fires (if at all) right in the beginning of a zero crossing of the voltage as applied to the pump. Therefore, if the circuit operates in the differential mode being equivalent to operation in the proportional range, the triac 50 will be fired for a particular number of AC cycles within a staircase cycle, and the triac 50 will not be fired for the remaining of the altogether 16 AC cycles that make up a staircase cycle. Consequently, the pump 15 receives current pulses of a length or duration that is in fact proportional, within the resolution of the counter of the staircase circuit, to the tank-collector temperature differential. These pulses have a repetition rate exactly equal to the counter and staircase recycling rate.

Considering the fact that normally the AC main frequency is 60 Hz then the counter repetition cycle and, therefore, the pulse rate as applied to the pump is 3.75 Hz. The pump as such is a normal AC driven pump and the pumping power will now be in proportion to the temperature differential. As long as the temperature differential is too small or even reverse, that is to say, that the collector temperature is only a little higher or even lower than the tank temperature, amplifier 31 provides a voltage that is below the lowest staircase voltage. Therefore amplifier 40 remains in the high state which causes the LED 52 to be on continuously. The triac will not fire under such conditions, and the pump will remain off. For a temperature differential which is quite large so that the output of amplifier 31 exceeds the highest staircase voltage, amplifier 40 remains low, and the triac 50 will be fired on each AC cycle; the pump just remains on and operates continuously at a maximum capacity.

The freezing and boiling protection control is superimposed upon the proportional control in the following manner: as far as impending freezing of the collector is concerned, this is a situation in which the collector temperature has dropped definitely to a value below the tank temperature. Therefore the output voltage of amplifier 31 remained quite low and the pump 15 stayed permanently off, because it is the purpose of the pump to pump heated collector water into the tank. If the collector is about to freeze, protection is needed and the operation should be reversed. The pump must operate and pump, in fact, some warmer water into the collector to prevent it from freezing. Accordingly, the output of amplifier 34 is fed to a signal isolating transistor 70 whose emitter collector path is, in effect, connected across the light emitting diode 52.

A condition that may invoke freeze protection operation is preceded by a high output of amplifier 40 turning diode 52 on, and the pump is off. As the freeze protect amplifier 35 causes the transistor 70 to conduct, diode 52 is in effect shorted out, and holds the optical coupler 51 in the off state. Thus, the triac 50 will be fired so that the pump 15 is turned on. Therefore, the pump 15 is operated irrespective of the fact that the signal from amplifier 31 is definitely of a value which holds amplifier 40 to a high state for turning on the light emitting diode 52; the short circuit of transistor 70 overrides the pump-off condition of the proportionate control.

An alternative protection against freezing of the collector involves control for valve 19. Transistor 70 is eliminated from the control circuit and, instead, amplifier 34 has its output connected via a diode 71 to a light emitting diode 62. This light emitting diode 62 pertains to an optical coupler and isolator 61 having a transistor assembly 63 which is rendered conductive whenever diode 62 emits light. Diode 62 emits light whenever its input as supplied via diode 71, is high. The valve 19 itself is controlled by a triac 60 which connects the valve across the mains. The valve control circuit is similar to the control circuit for pump 15, except that synchronization with the AC voltage is not necessary. Therefore, the light emitting diode 62 is strictly DC controlled and no connection to the AC mains is needed.

The control circuit for the triac 60 includes another relaxation oscillator comprised of resistors 64, a diac 65 and a capacitor 67 being interconnected analogously, as are the elements 54, 55, and 57 as described above. In addition, this second relaxation oscillator receives filtered DC power via the elements 54, 56, and 58. Circuit 63, when conductive, operates as a short circuit for the oscillator which prevents the triac 60 from firing. Circuit 63 when non-conductive (LED 62 off, 35 low) premits firing of the triac 60.

It can thus be seen that as the collector temperature approaches the freezing point, the output of amplifier 34 goes high, diode 62 shines and the valve 19 is deenergized. This means that normally valve 19 is energized, i.e., closed, and in the de-energized state, the valve opens, thereby draining the collector. If the collection-tank system is connected to the city water supply (valve 111 — FIG. 1), that valve is connected in parallel to valve 19 except that open and close states are reversed.

As an added precaution for such a situation, a diode 72 connects the output of the amplifier 34 also to the pump control circuit and causes a high voltage to be applied to the diode 52. A high voltage may well be and can reasonably be expected to be applied in diode 52 by the proportional amplifier 40 for holding the pump off, but this redundancy is a precaution so that in fact the pump cannot be turned on regardless of the development of signals in the proportional control part of the circuit. In other words, this particular circuit 34-72-52 prevents the pump from pumping water into the collector while the dump valve is open. Since the transmitter 21 senses collector temperature regardless of the state of filling, the freeze — protection will be removed as soon as the sun heats the collector.

Next, we consider the alternative position of switch 26, or an alternative connection of the fixed wired type of the inverting input for the freeze detector and amplifier 34. The output of the amplifier 31 is now fed to the inverting input of amplifier 34. A different adjustment of the potentiometer 36 is required for this particular instance; however the philosophy behind this particular connection is to drain the collector always whenever the temperature differential is so low or even has the wrong polarity that a pumping operation for purposes of gathering thermal energy does not take place. The amplifier 34 will respond to a condition which, as far as amplifiers 31 and 40 is concerned, turns the pump completely off. The circuit 61, 65 and 60 just opens the valve 19 and (if provided) closes valve 111, the valve solenoids are de-energized and energized as described, while diode 72 clamps the pump control circuit to the off state for the same reason explained earlier. In this case it makes no difference whether or not the outside conditions may in fact approach freezing conditions for the collection.

Whenever the temperature differential condition signals to the amplifier 31 that pumping operation is desired, the amplifier 34 may have already responded by removing the off clamp signal from the diode 52 and by removing the signal from 62, so that the transistor 63 does not inhibit the relaxation oscillations in the control circuit for triac 60. Therefore, firing pulses for the triac 60 are produced and the valve 19 is energized to close the collector drain, which valve 111 opens to repressurize the system.

The boiling protect circuit operates as follows: It will be recalled that amplifier 37 responds when the tank temperature approaches the boiling point. The high output of amplifier 37 is used first via a diode 73 to provide a high signal to the light emitting diode 52. It will be recalled that in a high temperature condition, the pump is expected to operate at full capacity. This means that amplifier 40 may provide a continuing low output thereby holding light emitting diode 52 off, and the pump 15 is thus operated on a continuous basis. Now, as the tank temperature approaches the boiling point, that controlled input for the pump control circuit is overridden in that the high signal from amplifier 37 turns light emitting diode 52 on and the pump stops.

In addition, a diode 74 provides an energizing signal to the light emitting diode 62. Therefore, the relaxation oscillator which includes the diac 65 is interrupted, the valve de-energizes, and valve 19 opens to dump the collector content. The purpose of this feature is strictly a precaution because if in fact the tank temperature approaches the boiling point, the collector will also be rather close to boiling or may already be heated to that danger level. Therefore, if the pump were turned off the collector content would not be replenished with cooler water and, therefore, the collector water would boil very soon, and possibly evaporate, leaving deposits and undesirable residue. Dumping the collector content when the system is about to boil in a simple way of preventing such depositing of residue.

If the system is under city water pressure the valve 111, being normally kept opened via the fired triac 60, will be closed.

The water system could be modified in that valves in the main path to and from the collector 12 are shut whenever the collector drain valve 19 opens. The tank can be continuously under city water pressure in that case. Thus, these valves will then be used in lieu of valve 111, but are connected with circuit just as is.

The invention is not limited to the embodiments described above but all changes and modifications thereof not constituting departures from the spirit and scope of the invention are intended to be included.

I claim:

1. In a system for transferring thermal energy between a storage tank for water and a solar heat exchanger and collector, there being a pump for pumping water from the tank through the heat exchanger and back into the tank, a first temperature sensitive element for sensing the temperature of the water as leaving the heat exchanger or as being held therein; a second temperature sensitive elememt for sensing the temperature of the water in the tank or as leaving the tank; and a bridge circuit which includes the first and second element and adjusted to provide for a signal representing the effective difference in temperature; the combination comprising: a difference amplifier connected across the bridge circuit to receive said bridge circuit signal and to provide an output signal proportionate to said difference;

a staircase signal generator providing a stepwise increasing signal on a cyclically repetitive basis, the steps occurring in synchronism with an AC voltage;

a comparator connected to receive said output signal and said staircase signal and providing a pulse train at a pulse rate frequency corresponding to the cyclic repetition of the staircase signal, the pulses having duration in proportion to said difference but in unit steps equal to an AC cycle; and an AC operated control circuit for the pump and responsive to said pulses to turn the pump on and off at instants corresponding to AC signal zero crossings so that the pump is operated by a sequence of pulses each being composed of a plurality of full AC waves.

2. In a system as in claim 1, including a second comparator connected to said first temperature sensitive element and to a reference signal to provide a control signal indicative of impending freezing of the collector; and circuit means for connecting the control signal from the second comparator to the AC operated control circuit for the pump, to override the responsiveness of said control circuit to said pulses and to turn on the pump permanently as long as said condition persists.

3. In a system as in claim 1, including another comparator connected to said circuit temperature sensitive element and to a source of reference voltage to provide a controlled signal representing exceeding of the tank temperature beyond a particular limit value; and circuit means for connecting the output of said other comparator to said control circuit to override pulse operation thereon and to turn off the pump, irrespective of said temperature differential.

4. In a system as in claim 1, and including additional comparator means connected to at least one of the elements to sense a thermal limit condition;

a dump valve for draining the collector; and a control circuit connected to the comparator means for controlling the valve to obtain draining when said limit condition has been reached.

5. In a system as in claim 4, and including circuit means responsive to the limit condition as signalled by the comparator means for overriding the control of the pump by said comparator to hold the pump off as long as the valve drains the collector.

6. In a system as in claim 1, and including additional comparator means, connected to said differential amplifier to sense a thermal limit condition;
a dump valve for draining the collector; and
a control circuit connected to the comparator means for controlling the valve to obtain draining when said limit condition has been reached.

7. In a system as in claim 6, and including circuit means responsive to the limit condition as signalled by the comparator means for overriding the control of the pump by said comparator to hold the pump off as long as the valve drains the collector.

8. In a system for transferring thermal energy between the storage tank for water and a solar heat exchanger and collector, there being a pump for pumping water from the tank through the solar heat exchanger and back into the tank, further including a first and a second detector means for detecting the temperature of water in or as leaving respectively the collector and the tank, the combination comprising:
first circuit means connected to the first and second detector means for providing a signal representing the temperature differential;
second circuit means connected to at least one of the first and second detector means for providing a signal representing a particular thermal limit condition; and
a pump control circuit connected to the first and second circuit means for providing drive signals for the pump so that electrical power applied to the pump is proportional to the temperature differential as long as the limit condition is not met, and providing a constant relatively high power signal if the temperature differential exceeds a particular value, and being further responsive to the signal from the second circuit means for providing a particular constant power to the pump overriding the proportional control when the thermal limit condition is exceeded.

9. In a system as in claim 8, including comparator means connected to said one detector means to sense the thermal limit condition;
a dump valve for draining the collector; and
a control circuit connected to the comparator means for controlling the valve to obtain draining when said limit condition has been reached.

10. In a system as in claim 9, and including circuit means responsive to the limit condition as signalled by the comparator means for overriding the control of the pump by said comparator to hold the pump off as long as the valve drains the collector.

11. In a system as in claim 8, said second circuit means being connected for providing a signal representing impending freezing of the collector defining said limit condition, said pump control circuit providing for pumping as long as said freezing condition is maintained, irrespective of said temperature differential.

12. In a system as in claim 8, said second circuit means connected to be responsive to impending boiling of the tank water, said pump control circuit turning the pump off in response to the output of the second circuit means.

13. In a system as in claim 9, wherein said pump control circuit includes pulse generating means and means connected to be responsive to the signal from the first circuit means for selecting a number of pulses per unit time in proportion to the last mentioned signal.

14. In a system for transferring thermal energy between a storage tank for water and a solar heat exchanger and collector, there being a pump for pumping water from the tanks through the solar heat exchanger and back into the tank, a dump valve for the collector and further including a first and a second detector means for detecting the temperature of the water in or as leaving respectively the collector and the tank, the combination comprising:
first circuit means connected to the detector means for providing a signal representing the temperature differential;
second circuit means connected to at least one of the detector means for providing a signal representing a particular thermal limit condition;
a signal generator providing a reference signal which changes gradually from a first value to a second value and jumps back to the first value on a cyclically repetitive basis;
a pulse train generator connected to receive the reference signal and the temperature differential signal to provide a train of pulses at a pulse rate equal to the repetition rate of the reference signal, the pulses having a width corresponding to the temperature differential;
a pump control circuit connected to the pulse train generator to operate the pump in response to the pulses; and
a valve control circuit connected to the second circuit to cause the valve to drain the collector when said limit condition is exceeded.

15. In a system as in claim 14, said limit condition being impending boiling of the tank water, said second circuit means being connected to the first detector means.

16. In a system as in claim 15, said second circuit means being connected to both detector means and responding to a second limit condition constituted by impending freezing of the collector.

17. In a system as in claim 16, said second circuit means causing the pump to operate in response to the second limit condition.

18. In a system as in claim 16, said second circuit means causing said valve to drain the heat exchanger also in response to the second limit condition.

19. In a system as in claim 11, said pump control circuit being connected to the second circuit to stop the pump or hold it to a stop state when the thermal limit condition is exceeded.

20. In a system as in claim 11, said limit condition being impending freezing of the collector water.

21. In a system for transferring thermal energy between a storage tank for water and a solar heat exchanger and collector, there being a pump for pumping water from the tank through the collector and back into the tank, the improvement comprising:
temperature differential means for establishing a first control signal which represents the temperature difference of said tank and of said collector, said first control signal having a first value for temperature differentials in which the heat exchange temperature is only slightly higher or lower than the tank temperature, the first control signal varying in proportion to the temperature differential for higher values of the differential;
a signal generator providing a second control signal which changes from the first value to the second value and jumps back to the first value on a cyclically repetitive basis;

a pulse train generator responsive to said first and second control signals and producing a train of pulses at a rate corresponding to the cyclic repetition of the second control signal, and at a pulse width corresponding to said differential, the train of pulses is not being produced when the first control signal values different from a range as defined by the first value, and by first control signals corresponding to said higher differential values; and a control circuit connected to receive the pulses from the pulse train generator operating the pump in response to the pulses.

22. In a system as in claim 21, including means for sensing thermal limit conditions;

a dump valve for draining the collector; and a control circuit connected to the comparator means for controlling the valve to obtain draining when said limit condition has been reached.

23. In a system as in claim 22, and including circuit means responsive to the limit condition as signalled by the comparator means for overriding the control of the pump by said comparator to hold the pump off as long as the valve drains the collector.

* * * * *